United States Patent

[11] 3,608,869

| [72] | Inventor | Robert A. Woodle |
| | | Nederland, Tex. |
| [21] | Appl. No. | 828,560 |
| [22] | Filed | May 28, 1969 |
| [45] | Patented | Sept. 28, 1971 |
| [73] | Assignee | Texaco Inc. |
| | | New York, N.Y. |

[54] SYSTEM FOR BLENDING LIQUID INGREDIENTS
7 Claims, 3 Drawing Figs.

[52] U.S. Cl. .................................................. 259/7,
                                                                259/154
[51] Int. Cl. .................................................. B01f 7/00,
                                                                B28c 7/04
[50] Field of Search .......................................... 259/4–10,
                                                                154, 18–26

[56] References Cited
UNITED STATES PATENTS

| 2,883,343 | 4/1959 | Faure et al. ..................... | 259/4 X |
| 3,041,049 | 6/1962 | Tarukawa ..................... | 259/9 |
| 3,224,738 | 12/1965 | Tarukawa ..................... | 259/154 X |
| 3,397,868 | 8/1968 | Schlernitzauea ............. | 259/8 |
| 3,433,464 | 3/1967 | Swafford et al. ............... | 259/X |

Primary Examiner—Paul R. Gilliam
Attorneys—K. E. Kavanagh, Thomas H. Whaley and Robert J. Sanders, Jr.

ABSTRACT: Disclosed is a system for automatically blending liquid ingredients which is useful to continuously or discontinuously provide blended products. A mixing vessel having an agitator is provided for blending the ingredients. Each of the liquid ingredients is admitted thereto in the form of a stream introduced at a uniform flow rate for a time interval proportional to the desired concentration in the product mixture of each respective ingredient. The individual time intervals of flow are kept small compared to the volume of the mixing vessel and are arranged sequentially so that ingredient segments of the product mixture are continuously added to the mixing vessel. The vessel is always maintained full by withdrawing the mixture at a rate equal to the rate at which the ingredients are added. Automatic time cycle control means and valves are provided so that the operating sequence can be rapidly performed and continuously repeated providing the capability of producing a continuous stream of the blended mixture. An output storage tank is provided which is fitted with a level controller which starts up and shuts down the blending system to meet varying output quantity demands of the blended products.

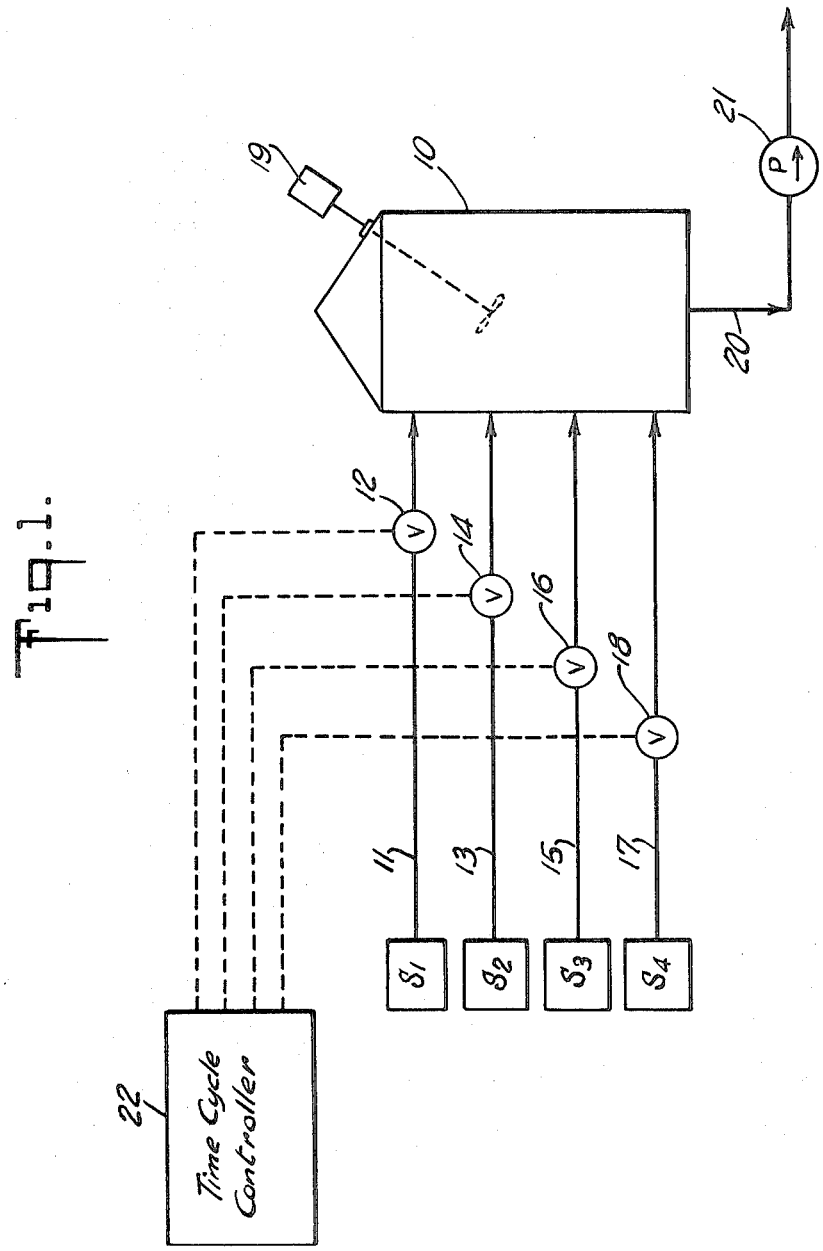

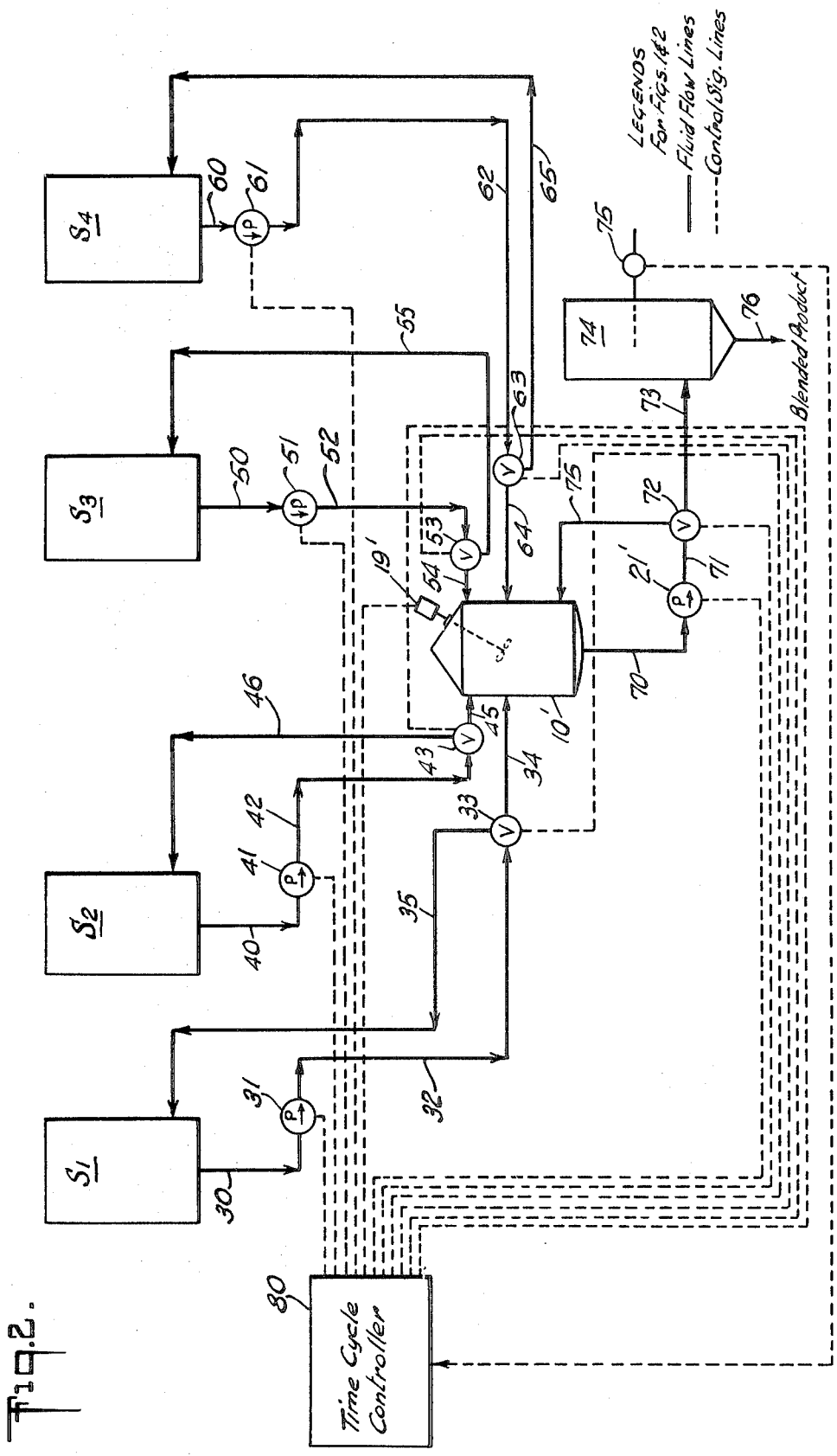

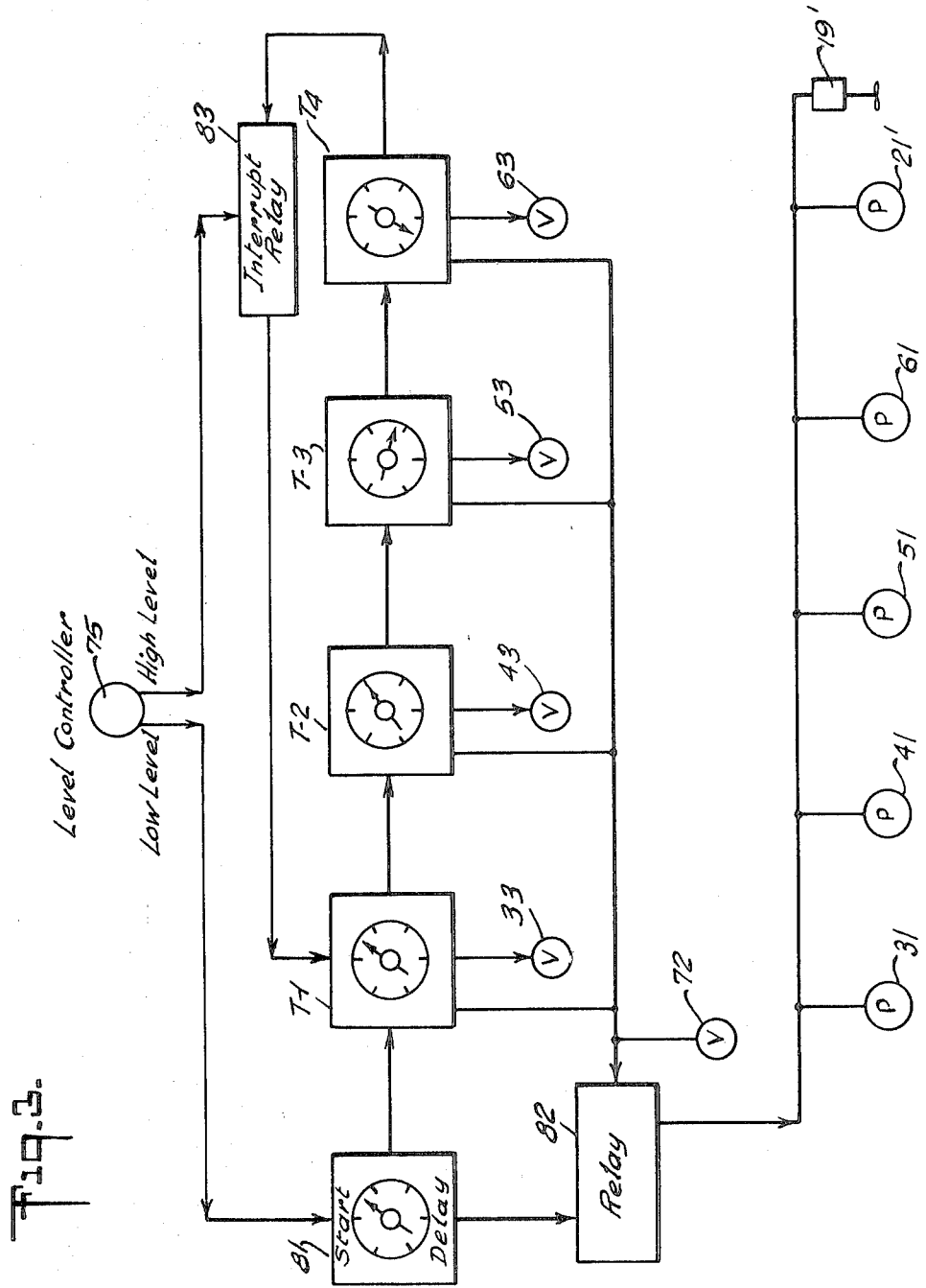

3,608,869

SYSTEM FOR BLENDING LIQUID INGREDIENTS

BACKGROUND OF THE INVENTION

This invention relates to a method and system for blending liquid ingredients. In one of its more specific aspects, this invention relates to a method and system free of any measurements of flow rates, or flow quantities, for blending a plurality of liquid ingredients to provide a mixture of predetermined composition.

In petroleum refining and related chemical industries automatic blending has become of increased importance because of the economic advantages of reduced tankage requirements and reduced inventories made possible thereby. However, the delivery of the required volume of each of the various components of the final mixture is difficult because of the various problems normally associated in the prior art with the measurement of flow rates, or flow quantities, in flowing streams of liquids. Automatic blending techniques of the prior art generally include the use of flow rate or flow quantity measuring equipment in conjunction with flow rate or flow quantity measuring equipment in conjunction with flow rate control equipment for adjusting the flow rates of the respective streams of the liquid ingredients being blended to provide a stream of the required mixture. This equipment is usually quite complex and expensive.

I have devised a method and an apparatus for blending which is less expensive, simpler, uses fewer components, and is accordingly more reliable than can be found in the prior art. The invention can be used in a batch process, that is, to prepare predetermined amounts of the blended mixture, or it can be used in a continuous manner such as in conjunction with a petroleum refining process for blending process streams. Also, it can be used at product dispatch facilities to minimize tankage requirements and improve the flexibility of such facilities for providing varied product blends.

SUMMARY

Briefly stated, one aspect of the invention resides in a system for blending a plurality of liquid ingredients to provide a mixture having a desired composition, that is, to provide a mixture having predetermined desired concentrations therein of each of the liquid ingredients. In accordance with this aspect of the invention the system includes, a mixing vessel wherein the liquid ingredients are mixed to provide the mixture, conduit means, such as, for example, a series of conduits coupled with the sources of the liquid ingredients for carrying a stream of each of the liquid ingredients to the mixing vessel, each of the streams being carried at substantially equal flow rates, automatic valve means connected with the conduit means for periodically switching on and off the flow of the streams of each of the liquid ingredients in response to control signals, and time cycle control and valve-actuating means for providing the control signals to operate the valve means, the time cycle control means being programmed to permit the flow of each respective stream of each of the liquid ingredients for a time interval of flow proportional to the respective desired concentration, in the mixture of each of the respective liquid ingredients, thereby depositing in the mixing vessel respective quantities of the liquid ingredients proportional to the respective desired concentrations thereof in the mixture.

In a further embodiment of the invention the aforementioned system is enlarged to provide the capability of supplying the mixture to meet varying output quantity demands of a continuous or discontinuous nature. The apparatus of this embodiment of the invention includes the aforementioned system, wherein the time cycle control and valve-actuating means control the valves in a timed sequence of operation in a manner such that the respective time intervals of flow, of each of the respective streams, substantially follow one another. The sequence commences with a first time interval of flow of a first of the liquid ingredients and terminates with a last time interval of flow of the last of the liquid ingredients. In the operating sequence each of the liquid ingredients experiences at least one time interval of flow of the specified duration. The sequence of operation is cyclically repeated to deposit, in a continuous manner, ingredient segments of the desired liquid mixture in the mixing vessel. This embodiment of the system further includes a product withdrawal pump connected with the mixing vessel for withdrawing the mixture in the form of a continuous stream, at a substantially uniform flow rate, the suction action of the pump sequentially drawing into the mixing vessel each of the liquid ingredients as the valve means are operated in accordance with the aforementioned sequence. Also included is a temporary storage tank connected with the product withdrawal pump for receiving the mixture and from which it is removed to satisfy the varying output demands. The temporary storage tank is fitted with a conventional liquid level controller which provides start and stop signals, for the system, in response to the liquid level in the temporary storage tank. The signals are respectively provided as the contents of this tank are depleted below a predetermined low level, and replenished above a predetermined high level. In this embodiment of the system the time cycle control and valve-actuating means are adapted to startup and shutdown the product withdrawal pump, and the cyclically repeated sequence of operation, in response to the level controller signals.

Another aspect of the invention resides in the method for providing the aforementioned liquid mixture, of the desired composition, including the steps of passing a first stream at a substantially uniform rate of the first of the liquid ingredients into a vessel for a first time interval proportional to the desired concentration of the first liquid ingredient in the mixture, repeating the first step in a timed sequence with respect to each of the balance of the liquid ingredients at flow rates substantially equal to the flow rate of the first stream, the respective time interval of flow of each of the balance of the ingredients being proportional to the respective desired concentration, in the mixture, of each of the balance of the ingredients, thereby depositing in the vessel respective quantities of the liquid ingredients proportional to the respective desired concentrations thereof in the mixture. In a preferred version of the method the further steps are added of agitating the contents of the vessel to provide a uniform blend of the mixture, and continuously repeating the aforementioned timed sequence of flow of the ingredients, while concurrently withdrawing a stream of the mixture from the vessel at a rate which is substantially equal to the flow rate of each of the ingredients into the vessel, thereby providing a continuous product stream of the desired mixture.

In view of the foregoing it is an object of the invention to provide a method and a system for blending a plurality of liquid ingredients to provide a mixture of predetermined composition.

Another object of the invention is to provide a method and a system free of any measurements of flow rates, or flow quantities, for blending a plurality of liquid ingredients to provide a mixture of predetermined composition.

Another object of the invention is to provide a method and a system for automatically blending a plurality of liquid ingredients to provide a mixture of predetermined composition and having the capability to meet varying output quantity demands of a continuous or discontinuous nature.

Another object of the invention is to provide a method and a system, amenable to control thereof by computer, for automatically blending a plurality of liquid ingredients to provide a mixture of predetermined composition.

These and other objects, advantages and features of the invention, will be more fully understood by referring to the following description and claims, taken in conjunction with the accompanying drawings.

BRIEF DESCRIPTION OF THE DRAWINGS

FIG. 1 is a schematic block diagram of a simplified blending system illustrating features of the invention.

FIG. 2 is a schematic block diagram of a blending system in accordance with the invention adapted to meet various output quantity demands of the blended mixture.

FIG. 3 is a schematic block diagram of a time cycle controller which can be used as the time cycle controller of FIG. 2.

DESCRIPTION OF THE PREFERRED EMBODIMENTS

Referring now to FIG. 1, which illustrates in simplified form a blending system in accordance with the invention, a mixing vessel 10 is provided in which the liquid ingredients are mixed. The liquid ingredients are introduced into the system from the respective sources, $S_1$–$S_4$. Any number of liquid ingredients can be blended. Four are shown for illustrative purposes. The first liquid ingredient from the sources $S_1$ passes through a conduit 11 in which is series connected a solenoid-operated valve 12. The outlet port of the valve 12 is connected with the mixing vessel 10, for carrying thereto a stream of the first liquid ingredient. A stream of the second liquid ingredient is similarly carried to the mixing vessel 10, entering into the system through a conduit 13, in which is series connected a solenoid valve 14, which is, in turn, connected with the mixing vessel 10. A stream of the third liquid ingredient is introduced into the system through a conduit 15 connected with the source $S_3$. Series connected in the conduit 15 is a solenoid operated valve 16, the outlet port of which, is, in turn, connected with the mixing vessel 10. A stream of the fourth liquid ingredient is similarly carried into the system passing through a conduit 17 connected with the source $S_4$. Series connected in the conduit 17 is a solenoid-operated valve 18, the outlet port of which is connected with the mixing vessel 10.

The mixing vessel 10 is fitted with a conventional rotary agitator 19, which includes a motor mounted external to the mixing vessel and an impeller submerged in the mixture driven by the motor through a conventional rotating seal mounted in the mixing vessel wall. An outlet conduit 20 is fitted to the mixing vessel through which the product mixture is withdrawn by a conventional pump 21, connected with the conduit 20. A time cycle controller 22 is provided to control the operating sequence of the solenoid valves 12, 14, 16 and 18.

The time cycle is such that the various liquid ingredients to be blended are admitted one at a time to the mixing vessel 10, which is always maintained filled with liquid, and from which the mixture is pumped at a relatively constant rate by the withdrawal pump 21. The liquid ingredients are admitted sequentially for short periods in such a way that one ingredient is being admitted at any given time. Accordingly, if we let:

$t_n$ = the time interval during which ingredient, $n$ is added, and given over a short time interval T, that the volume rate into the mixing vessel is equal to the volume rate out of the mixing vessel, which is equal to a constant, K, then:

volume fraction $n$ in mixture =

$$\frac{t_n K}{\sum_{m=1}^{n}(t_m K)} \qquad (1)$$

reduced to its simplest form:

volume fraction $n$ in mixture $= t_n/T$ (2)

where:

T = the total cycle time over which all of the ingredients are added.

Equation 2 states that since the rate flowing out of the mixing vessel is essentially constant over the relatively short cycle time, T, then the volume fraction of each ingredient, in the product mixture, is exactly proportional to that ingredients fractional part of the total cycle time, T.

For accurate blending it is important that the pump 21 transports the product stream at a relatively constant rate. Since the pump transports material of a relatively constant composition, against a relatively constant head, this condition is readily achieved by use of a conventional pump. It is important to note that separate pumping of each individual ingredient stream is not required since the mixing vessel, in conjunction with its inlet conduits, and product withdrawal facility, form a sealed system. Therefore, the suction action of the product withdrawal pump draws each of the streams, sequentially, as their respective solenoid valves are opened.

It can be appreciated by those skilled in the art that the agitation of the mixture, provided by the agitator 19, can be accomplished by any of a number of ways which causes a mixing motion of the mixture. Also, the agitator 19 can be omitted if the velocities of the liquid ingredients admitted, and the shape of the mixing vessel are such that a swirling or mixing action is attained in the mixing vessel.

In the foregoing, a complete cycle, or sequence of operation, is defined as a sequence in which all of the liquid ingredients are admitted for respective time intervals of flow proportional to their respective required concentration in the product mixture. These time intervals however, can be further subdivided if it is desirable to do so for a particular purpose such as, for example, for ease of blending. Thus, if it is desired to provide a blend of four ingredients wherein three are to be of equal concentrations, and the fourth is to have twice the concentration of the others, a sequence of operation consisting of equal time intervals of flow of each ingredient can be used and the last ingredient would be admitted for two such time intervals. The intervals can be arranged in any order in the sequence of operation. Accordingly, in the preparation of any blend, the total time interval of flow of each ingredient can be subdivided in any convenient manner, and arranged in any convenient order, in the sequence of operation. However, as the distinct time increments of flow are shortened the transient response time of the valves becomes important. Accordingly, for short time increments the sequential operation of the valves can be timed to include a certain degree of overlap to compensate for the transient response time.

It can be appreciated by those skilled in the art that the system of the invention can be used in a mode of continuous operation wherein the operating sequence is cyclically repeated for providing a continuous stream of the blended mixture. It can also be used in a batch-type manner to provide predetermined amounts of the blended product.

Referring now to FIG. 2 which is a schematic block diagram of a blending system in accordance with the invention adapted to meet various output quantity demands of the blended mixture, items which are essentially as described in reference to FIG. 1 bear the same identification numeral but with a prime designation. As in FIG. 1, there is illustrated a blending system for four liquid ingredients from sources $S_1$ through $S_4$, inclusive. The sources $S_1$–$S_4$ can be tankage of the ingredients, or they can be conduits carrying process streams of the ingredients.

A conduit 30 is provided, connected with the source $S_1$, for carrying the first liquid ingredient. Series connected in the conduit 30 is a conventional circulation pump 31. Connected with the outlet of the pump 31, is a conduit 32, for carrying the first ingredient. Series connected in the conduit 32 is a conventional electrically operated three-way diverting valve 33. Connected with the first outlet port of the diverting valve 33 is a conduit 34, which is in turn connected with the mixing vessel 10' for carrying the first ingredient thereto. A conduit 35 is connected with the second port of the diverting valve 33 for carrying the first ingredient back to the source $S_1$ when the diverting valve is in its second operative position.

The mixing vessel 10' is similarly coupled to the other sources of the liquid ingredients $S_2$–$S_4$. Thus, a conduit 40 is connected with the source $S_2$ for carrying the second ingredient which is drawn by a circulation pump 41. A conduit 42 is connected with the outlet port of the pump 41 and carries the second ingredient to a conventional electrically operated three-way diverting valve 43, the first outlet port of which is in turn connected with the mixing vessel 10' by a conduit 45. A conduit 46 is connected with the second outlet port of the diverting valve 43 for carrying the second ingredient back to the source $S_2$ when the diverting valve 44 is in its second operative position. The third liquid ingredient is similarly introduced into the mixing vessel 10' passing through a conduit 50 connected with the source $S_3$, is drawn by a circulation pump 51, passes through a conduit 52, and thence through an electrically operated three-way diverting valve 53, the first outlet port of which, is, in turn, connected with the mixing vessel 10' by a conduit 54. A conduit 55 is connected with the second outlet port of the diverting valve 53 for carrying the third liquid ingredient back to the source $S_3$, when the diverting valve 53 is in its second operative position. Also, the fourth liquid ingredient from the source $S_4$ is introduced by passing through a conduit 60 connected with a circulating pump 61, the outlet of which is connected with a conduit 62 which carries the fourth ingredient to an electrically operated three-way diverting valve 63, the first outlet port of which is connected with the mixing vessel 10' by a conduit 64. A conduit 65 is connected with the second outlet port of the valve 63 for carrying the fourth liquid ingredient back to the source $S_4$ when the diverting valve 63 is in its second operative position.

The mixing vessel 10' is fitted with a rotary agitator 19' as discussed above in reference to FIG. 1, and a product withdrawal pump 21' is connected with the mixing vessel by a conduit 70. The outlet port of the pump 21' is connected with a conduit 71 which carries the product mixture to an electrically operated three-way diverting valve 72, the first outlet port of which is connected with a conduit 73, which carries the product mixture to a temporary storage tank 74. The second outlet port of the diverting valve 72 is connected with a conduit 75 which carries the product mixture back to the mixing vessel when the diverting valve 72 is in its second operative position. Blended product is removed from the system, to meet the demands therefor, through a conduit 76 connected with the tank 74. The temporary storage tank 74 is fitted with a conventional level controller 75 which provides a startup signal for initiating the repeated sequence of operation when the liquid level in the tank 74 declines below a predetermined low-level setting, and also provides a shutdown signal for discontinuing the repeated sequence of operation when the level in the tank 74 attains a predetermined high-level setting. These predetermined settings are manually entered into the level controller 75. The signals from the level controller 75, are carried to a time cycle controller 80, which controls the operation of the system.

The diverting valves 33, 43, 53, and 63, control the flow of the respective ingredients to the mixing vessel 10' essentially in accordance with the operating sequence described in reference to FIG. 1. When any one of these diverting valves is in its first operative position it permits its respective liquid ingredient to pass to the mixing vessel. When the valve is actuated to its second operative position, it diverts the flow of its respective liquid ingredient to its second outlet port and thence it returns to its respective source. Accordingly, each of the circulation pumps 31, 41, 51, and 61 can be permitted to operate continuously throughout the sequence of operation.

When the level in the temporary storage tank 74 falls below the low-level setting, the time cycle controller 80, in response to the level controller, initiates the following operations:

a. The circulation pumps for those ingredients to be used in the blend such as 31, 41, 51 and 61 are started. The ingredients to be used are determined in advance and entered by a nonzero time setting on each appropriate ingredient timer of the time cycle controller 80.

b. Simultaneously with (a), the agitator 19' and the product withdrawal pump 21' are started.

c. After a short delay, such as, for example, 10 seconds, to allow the pumps and the agitator to come up to speed, the operating sequence of the ingredient valves 33, 43, 53, and 63, is started and accordingly each valve is sequentially actuated to its first operative position for the prescribed time interval which is set, in advance, in each respective ingredient timer of the time cycle controller 80. Simultaneously with actuation of the first ingredient valve, the valve 72 is actuated to its first operative position permitting a flow of the product mixture to the storage tank 74. The valve 72 is maintained in its first operative position as long as any one of the ingredient valves is passing an ingredient to the mixing vessel. When none of the ingredient diverting valves are in their first operative position the valve 72 is actuated to its second operative position and the blended stream is recycled to the mixing vessel 10'.

d. As long as the level in the tank 74 is below the high-level setting, the time cycle controller 80 continues to repeat the sequence of operation permitting each of the liquid ingredients to be sequentially admitted into the mixing vessel. Also, all the pumps and the agitator operate continuously, and the blended mixture is passed through the valve 72 to the storage tank 74.

e. As soon as the liquid level in the storage tank 74 attains the high-level setting the level controller provides a shutdown signal which is carried to the time cycle controller 80, which in response, stops all the pumps, returns all the valves to their second operative position, and its timer is reset for a fresh start as in (a).

The form of the control signals from the level controller 75 is quite optional provided that the time cycle controller is capable of interpreting the high- and low-level events separately. Thus, the low-level event can be identified by the presence of a voltage signal, and the high-level event can be identified by the absence of the same signal.

The predetermined high- and low-limit set points applied to the level controller 75, can be spaced quite close together since the mixture is well blended in the mixing vessel. Indeed, these settings can be spaced as close as corresponds to the liquid quantity blended in a single time sequence, T. However, it is preferred that these settings be spaced apart at a volumetric difference corresponding to approximately 50 percent of the volume of the mixing vessel so that repetitive short time operation is avoided in getting output demands. Also, the low-limit set point is chosen at a value such that any foreseeable high-rate output demands which exceed the continuous output capability of the mixer, can be met for a reasonable period of time. Accordingly, a suitable sizing of the temporary storage tank 74 would be a volume about equal to the volume of the mixing vessel 10'.

The design of the system there are two important considerations. These are (1) the length of the time cycle of the sequence adding the ingredients, and (2) the residence time in the mixer. Regarding the time cycle, the shortest practical time cycle is the most desirable, since as the time cycle becomes vanishingly short a true continuous proportioning of the ingredients is closely approximated. The time cycle, in turn, is related to the residence time in the mixing vessel since, as the mixing vessel volume becomes larger, the importance and effect of the cycle time becomes diminished. Another factor to be considered is the residence time distribution in the mixing vessel, that is, the extent of how efficiently the residence time is spent for the purpose of mixing in the vessel, and whether or not that residence time is spent in one well-stirred vessel, or in a series of smaller mixers, with no back mixing between them.

Clearly, many physical configurations and design variations of the system of FIG. 2 are possible. One example which has been found suitable is to employ a cycle time, T, of 100 seconds. Thus, the time interval each ingredient is admitted to the mixing vessel, in seconds, is equal to the volume percent of that ingredient in the product blend. Also, it has been found desirable to program the time cycle controller so that no one ingredient is added for a continuous period greater than 10 seconds. Some typical time cycles are:

| Desired Product | Time, secs. |
| --- | --- |
| 50% A | 10 |
| 50% B | 10 |

Table—Continued

| | |
|---|---|
| 30% A | 3.0 |
| 70% B | 7.0 |
| 25% A | 5.0 |
| 25% B | 5.0 |
| 50% C | 10.0 |

Furthermore, it has been found desirable to provide sufficient mixing volume in the mixing vessel for approximately a 10 min. nominal residence time calculated at a maximum product delivery rate provided by the product withdrawal pump 21'. Thus, for a blending system capable of delivering about 100 g.p.m., a mixing vessel 6 feet in diameter by 5 feet in height represent a suitably sized mixer. In the alternate, a series of smaller stirred vessels can be used in place of the one larger mixer. Although some saving in liquid holdup can be effected this way, such an arrangement is more expensive than the use of a single mixing vessel.

It can be seen from the foregoing that the blending system of this invention provides great flexibility and can be used in many applications. These include:

1. The blending of lubricating oil products at bulk plants or at dispatch points.
2. The blending of special lubricant formulations at the utilization locations.
3. The blending of special chemical formulations such as, for example, fertilizer solutions.
4. The blending of gasoline or other fuel liquids to obtain desired properties.

Referring now to FIG. 3 which illustrates an example of the time cycle controller 80 of FIG. 2 the equipment items connected thereto are identified by the same numeral used in FIG. 2. A start delay timer 81 is provided for controlling the startup time delay of the system. Ingredient timers T-1 and T-4 are provided for controlling the respective flow time intervals of the liquid ingredients being blended. Each of the timers illustrated is of the synchronous motor-driven type which trips its contacts after an adjustable time interval. Each timer is provided with a time calibrated dial face and setting provision for manually entering the desired time interval. A suitable timer which can be used in each of the above instances is the Bristol series 55 delay timer, manufactured by Vocaline Co. of America, Inc. Old Saybrook, Conn., as described in their Bulletin B-32.

The start delay timer 81 is manually set to the desired startup time delay for bringing the various pumps to steady state operation. The ingredient timers, T-1 through T-4, are each set to the required time interval of flow of each of the respective ingredients being blended. The timers are arranged in series such that as each timer completes its timing cycle it triggers the next timer to begin its timing cycle. The last timer T-4 is connected with the timer T-1 so that the timing sequence is continuously repeated. This connection is through the contacts of an interrupt relay 83, which when opened prevents the operation of the next cycle accordingly shutting down the system.

When the level controller 75 senses the predetermined low level in the temporary storage tank, it provides a signal which is carried to the start delay timer 81 which immediately releases a startup signal and begins its startup time count. The startup signal is carried to a relay 82 which upon being energized closes its contacts which are connected with a suitable source of power, not shown, and applies this power to the pumps 31, 41, 51, 61, 21', and the agitator 19'. After the startup time interval the start delay timer 81 automatically resets itself to zero and triggers the first ingredient timer T-1 which begins its time count. Upon beginning its time count it immediately actuates the diverting valve 33 to its first operative position permitting the first ingredient to flow into the mixing vessel. It simultaneously provides a second control signal which is wired in parallel with similar second signals from the other ingredient timers which are transmitted to the valve 72 and to the relay 82. The relay 82 is a two-coil relay such that when either of its coils is energized its contacts are closed providing power to the various pumps. Its first coil is wired to the start delay relay 81 and its second coil receives the respective second signals from each of the ingredient timers so that when any one of the ingredient timers is in a time cycle the relay 82 is energized and the pumps are operated. The valve 72 is also actuated by the aforementioned second signals and accordingly permits the blended products to be withdrawn from the mixing vessel and deposited in the temporary storage tank 74 when any of the ingredient timers is in its timing cycle.

When the ingredient timer T-1 completes its time cycle it triggers the second ingredient timer T-2 and it interrupts its two output control signals accordingly returning the diverting valve 33 to its second operative position, and discontinuing its second signal. Upon being triggered, the second ingredient timer T-2, begins its time cycle, provides its own second output signal, and simultaneously actuates the valve 43 to its first operative position permitting the second liquid ingredient to enter the mixing vessel. This mode of operation is repeated by the ingredient timers, T-3 and T-4, controlling the time intervals of flow of the third and fourth liquid ingredients completing the timed sequence of operation. When this occurs the ingredient timer T-4 triggers the first ingredient timer to begin the cycle again. The cycle is continuously repeated as long as the liquid level in the storage tank 74 is below the high-level set point.

When the high-level set point is reached the high-level signal is transmitted to the interrupt relay 83 which opens its contacts and accordingly prevents the commencement of the next timing sequence. The timing sequence then in progress continues until the timer T-4 completes its timing count. When each of the timers completes its respective timing count it automatically resets itself to its starting position. Accordingly, when the operation is stopped the time cycle controller as a system, is in a reset condition ready to start operation the next time the level in the tank 74 drops to the low-level setting.

It can be readily appreciated by those skilled in the art that various arrangements of known program-timing equipment can be used in place of the system illustrated in FIG. 3. This illustrated system is preferred due to its simplicity in combination, and since it is relatively inexpensive.

The following are examples of the blending system of this invention applied in two ways to prepare specific blends.

EXAMPLE I

To satisfy a demand for five distinct grades of refrigeration oils, refined from wax-free naphthene lube oil fractions, it is necessary to stock only the lightest and the heaviest grades from which all five grades can be prepared as follows:

| Grade | Composition | Viscosity, SUS at 100° F. |
|---|---|---|
| AA | 100 vol. % AA | 80 |
| A | 80% AA/20% D | 100 |
| B | 47% AA/53% D | 150 |
| C | 28% AA/72% D | 200 |
| D | 100 vol. % D | 300 |

The earlier practice was to stock each sales terminal with a supply of each of the five grades of oil, accordingly incurring high shipping and inventory costs. By installing the system of the invention it is only necessary to stock the lightest (AA) and heaviest (D) grades. The intermediate grades, A, B, and C, are blended and dispensed as required.

EXAMPLE II

A similar example is found with regard to meeting requirements for eight grades of Meropa-type gear lubricants, which are oils prepared from refined naphthene base lube oil fractions. The eight grades can be blended from only three stocked grades as follows:

| Oil & Grade | composition | Viscosity, SUS at 210° F. |
|---|---|---|
| Meropa 1 | 100 Vol. % 1 | 55 |
| 2 | 57 Vol. % 1, 43 Vol. % 6 | 75 |
| 3 | 33 Vol. % 1, 67 Vol. % 6 | 100 |
| 4 | 79 Vol. % 1, 21 Vol. % 6 | 120 |
| 5 | 89 Vol. % 1, 11 Vol. % 6 | 135 |
| 6 | 100 Vol. % 6 | 166 |
| 7 | 75 Vol. % 6, 25 Vol. % 8 | 225 |
| 8 | 100 Vol. % 8 | 450 |

The various valves illustrated in FIGS. 1 and 2 have been described as electrically operated valves which are well known. It can be appreciated by those skilled in the art that motor driven and pneumatic valves can be used in place of valves described by simple modifications or substitutions of the valve-actuating elements. Thus, for example, if a pneumatic system should be desired presently known electrical to pneumatic converters can be appropriately utilized in the system.

It can also be appreciated by those skilled in the art that the functions performed by the time cycle controller can be advantageously performed by a digital computer. Thus, a computer which is installed for controlling a complete facility, or process, can also economically control the blending system of the invention, since timed control events, as are involved here, are particularly amenable to control by digital computer. A further advantage of such an installation is the flexibility provided by the computer whereby it can readily adjust the blending cycle in response to any automatically sensed process variable to obtain any specific control objectives, or to obtain a particular blended product.

While the invention has been described with a certain degree of particularity, it can, nevertheless, be seen by the examples hereinabove set forth, that many modifications and variations of the invention can be made without departing from the spirit and scope thereof.

What is claimed is:

1. A system for the automatic blending of a plurality of liquid ingredients from respective sources thereof to provide a mixture having predetermined desired concentrations therein of each of said liquid ingredients comprising:
   a. a mixing vessel including means for mixing said liquid ingredients therein to provide said mixture, and means for withdrawing a substantially continuous stream of the blended mixture from said mixing vessel;
   b. respective conduit means connected between each of a plurality of said sources of said liquid ingredients and said mixing vessel for carrying respective streams of each of said liquid ingredients from the respective ones of said sources to said mixing vessel, said conduit means providing each of said streams at substantially equal flow rates;
   c. automatically operable valve means mounted in each of said conduit means for selectively switching on and off each of said streams in response to respective control signals;
   d. a master time cycle control means having a respective control circuit means coupled to each of said automatically operable valve means for supplying said control signals to said valve means, said master time cycle control means being programmed to provide said control signals for actuating the respective valve means for opening each in turn for respective time intervals of flow of duration proportional to the respective desired concentration in said mixture of said liquid ingredient, thereby depositing in said mixing vessel respective quantities of said liquid ingredients proportional to the respective desired concentrations thereof in said mixture timed to achieve the desired liquid mixture in said mixing vessel, said master time cycle control means providing said control signals in time sequence of operation such that said respective time intervals of flow of each of said respective streams substantially follow one another in time, said sequence of operation commencing with a first of said time intervals of flow of the first of said liquid ingredients and terminating with a last time interval of flow of the last of said liquid ingredients in said sequence, each of said liquid ingredients experiencing at least one time interval of flow during each operating cycle; and
   e. means sensitive to output quantity demands of said means for withdrawing said stream from said mixing vessel and coupled to said time cycle control for actuating the operating sequence thereof in response to such output quantity demands.

2. A system as defined in claim 1 wherein the means for withdrawing said stream of the blended mixture from said mixing vessel comprises a product withdrawal pump coupled to an exit opening of said mixing vessel for withdrawing therefrom said mixture, said pump having a control circuit coupled to said master time cycle control means and being responsive to a pump control signal provided by said master control means for causing said pump to operate substantially concurrent with said timed sequence of operation of said valve means for supplying said liquid ingredients to said mixing vessel.

3. Apparatus as defined in claim 1 wherein the means for withdrawing said stream of the blended mixture from said mixing vessel includes a temporary storage tank and means including a level controller responsive to the level of liquid in said storage tank and having output for providing a signal indicating the level of liquid in said tank and circuit means coupling the output of said level controller to said master time cycle control means for activating said master time cycle control means in response to a signal from said level controller to cause said master control means to activate said valve means for supplying said liquid ingredients to said mixing vessel in response to the level of the liquid in said temporary storage tank.

4. Apparatus as defined in claim 2 wherein the means for withdrawing said stream of the blended mixture from said mixing vessel includes a temporary storage tank and means including a level controller responsive to the level of liquid in said storage tank and having output for providing a signal indicating the level of liquid in said tank and circuit means coupling the output of said level controller to said master time cycle control means for activating said master time cycle control means in response to a signal from said level controller to cause said master control means to activate said valve means for supplying said liquid ingredients to said mixing vessel in response to the level of the liquid in said temporary storage tank.

5. Apparatus as defined in claim 1 further comprising circuit means coupled from said time cycle control means to the means for mixing said liquid ingredients in said mixing vessel and wherein said mixing means is responsive to a signal from said master control means for automatically turning said mixing means on and off in correlation with the introduction of said liquid ingredients into said mixing vessel.

6. The system of claim 1 further comprising a plurality of circulation pumps respectively coupled to one of said sources of said liquid ingredients, said pumps being operatively positioned in said respective conduit means to provide a liquid circulation pressure in the respective streams from the respective sources of said liquid ingredients through said conduit to said mixing vessel, said pumps having control circuits coupled to said master control means over respective circuit paths and being responsive to signals supplied by said master control means for controlling the operation thereof in timed sequence.

7. Apparatus as defined in claim 3 further comprising circuit means coupled from said time cycle control means to the means for mixing said liquid ingredients in said mixing vessel and wherein said mixing means is responsive to a signal from said master control means for automatically turning said mixing means on and off in correlation with the introduction of said liquid ingredients into said mixing vessel.

PO-1050
(5/69)

UNITED STATES PATENT OFFICE
CERTIFICATE OF CORRECTION

Patent No. 3,608,869   Dated September 28, 1971

Inventor(s) ROBERT A. WOODLE

It is certified that error appears in the above-identified patent and that said Letters Patent are hereby corrected as shown below:

Column 6, line 39, "getting" should read --meeting--; line 46, "The" should read --In the--.

Column 7, line 35, "T-1 and T-4" should read --T-1 through T-4--.

Signed and sealed this 4th day of April 1972.

(SEAL)
Attest:

EDWARD M. FLETCHER, JR.          ROBERT GOTTSCHALK
Attesting Officer                Commissioner of Patents